US012226842B2

(12) United States Patent
Okuhira et al.

(10) Patent No.: US 12,226,842 B2
(45) Date of Patent: Feb. 18, 2025

(54) PORTABLE BAND SAW

(71) Applicant: MAKITA CORPORATION, Anjo (JP)

(72) Inventors: Yuta Okuhira, Anjo (JP); Yukinori Suzuki, Anjo (JP); Yuki Fujiwara, Anjo (JP)

(73) Assignee: MAKITA CORPORATION, Anjo (JP)

( * ) Notice: Subject to any disclaimer, the term of this patent is extended or adjusted under 35 U.S.C. 154(b) by 0 days.

(21) Appl. No.: 17/825,930

(22) Filed: May 26, 2022

(65) Prior Publication Data

US 2023/0007824 A1    Jan. 12, 2023

(30) Foreign Application Priority Data

Jul. 7, 2021    (JP) ................................ 2021-113046

(51) Int. Cl.
*B23D 53/12* (2006.01)
(52) U.S. Cl.
CPC .................... *B23D 53/12* (2013.01)
(58) Field of Classification Search
CPC .......... B23D 5/12; B23D 55/00; B23D 53/12; B23D 53/001; B23D 53/00; B23D 53/082; B27B 13/00
USPC .......................................... 30/380, 286, 289
See application file for complete search history.

(56) References Cited

U.S. PATENT DOCUMENTS

| | | | | |
|---|---|---|---|---|
| 4,766,790 A * | 8/1988 | Harris | ................. | B23D 59/008 83/72 |
| 8,549,759 B2 * | 10/2013 | Bertsch | ................. | B23D 53/12 30/286 |
| 9,228,809 B1 * | 1/2016 | Relyea | ................. | F41J 9/02 |
| 11,167,403 B2 * | 11/2021 | Hashimoto | ............. | H02K 5/08 |
| 11,213,934 B2 * | 1/2022 | Bandy | ................. | B25B 21/02 |
| 2002/0035893 A1 * | 3/2002 | Schurb | ................ | B23D 63/008 76/40 |
| 2003/0163924 A1 * | 9/2003 | Hempe | ................. | B23D 49/16 30/388 |

(Continued)

FOREIGN PATENT DOCUMENTS

| | | |
|---|---|---|
| JP | 2007-090458 A | 4/2007 |
| JP | 2019-089156 A | 6/2019 |
| JP | 2020-138272 A | 9/2020 |

OTHER PUBLICATIONS

Oct. 22, 2024 Office Action issued in Japanese Patent Application No. 2021-113046.

*Primary Examiner* — Evan H MacFarlane
*Assistant Examiner* — Fernando A Ayala
(74) *Attorney, Agent, or Firm* — Oliff PLC

(57) ABSTRACT

A portable band saw reduces the overall size increase when a larger controller is included. A portable band saw includes a first saw wheel, a second saw wheel, a band saw blade placed on the first and second saw wheels, a motor that drives the first saw wheel and has a rotation axis in a front-rear direction, a controller that controls the motor, and a housing including a first housing accommodating the first saw wheel, a second housing accommodating the second saw wheel, and a bridge housing accommodating the motor between the first and second housings. The band saw blade is at least partly in an opening below the bridge housing. The controller is in the bridge housing with its maximum surface facing upward.

9 Claims, 11 Drawing Sheets

(56) References Cited

U.S. PATENT DOCUMENTS

| | | | |
|---|---|---|---|
| 2005/0188550 A1* | 9/2005 | Uehlein-Proctor | B23D 53/12 30/380 |
| 2006/0144202 A1* | 7/2006 | Tokiwa | B23D 59/001 83/76 |
| 2007/0068011 A1* | 3/2007 | Shibata | B27B 13/16 30/380 |
| 2007/0210733 A1* | 9/2007 | Du | H02K 1/278 318/268 |
| 2008/0276775 A1* | 11/2008 | Hewitt | B27B 13/10 83/810 |
| 2009/0265943 A1* | 10/2009 | Miller | B23D 53/12 30/380 |
| 2011/0197457 A1* | 8/2011 | Wackwitz | B23D 55/00 83/816 |
| 2013/0219725 A1* | 8/2013 | Winkel | B23Q 15/007 30/228 |
| 2014/0261368 A1* | 9/2014 | Nakagawa | B28D 1/08 125/21 |
| 2015/0263592 A1* | 9/2015 | Kawakami | B25F 5/008 451/359 |
| 2015/0280532 A1* | 10/2015 | Mizutani | H02K 7/14 310/50 |
| 2016/0151845 A1* | 6/2016 | Yamamoto | B23D 51/16 173/179 |
| 2016/0363510 A1* | 12/2016 | Kanack | B25B 27/10 |
| 2017/0068011 A1 | 3/2017 | C. et al. | |
| 2017/0088013 A1* | 3/2017 | Shimizu | B60L 50/51 |
| 2017/0334056 A1* | 11/2017 | Kawakami | B25F 5/006 |
| 2019/0143555 A1* | 5/2019 | Nakashima | B23D 45/16 30/376 |
| 2020/0001382 A1* | 1/2020 | Kani | B23D 55/10 |
| 2021/0362254 A1* | 11/2021 | Petts | B23D 55/082 |
| 2022/0234123 A1* | 7/2022 | Zhou | B25F 5/02 |

\* cited by examiner

PORTABLE BAND SAW

CROSS-REFERENCE TO RELATED APPLICATIONS

This application claims the benefit of priority to Japanese Patent Application No. 2021-113046, filed on Jul. 7, 2021, the entire contents of which are hereby incorporated by reference.

BACKGROUND

1. Technical Field

The present disclosure relates to a portable band saw.

2. Description of the Background

A portable band saw described in, for example, Japanese Unexamined Patent Application Publication No. 2020-138272 is known in the field of portable band saws.

BRIEF SUMMARY

A portable band saw includes a motor and a controller controlling the motor. A drive current to drive the motor is supplied to the motor through the controller. When a larger drive current is used, a larger controller may be used. A technique is awaited to reduce the overall size increase of a portable band saw when a larger controller is included.

One or more aspects of the present disclosure are direct to reduce the overall size increase of a portable band saw when a larger controller is included.

A first aspect of the present disclosure provides a portable band saw, including:
- a first saw wheel;
- a second saw wheel;
- a band saw blade placed on the first saw wheel and the second saw wheel;
- a motor configured to drive the first saw wheel, the motor having a motor rotation axis extending in a front-rear direction;
- a housing including
  - a first housing accommodating the first saw wheel,
  - a second housing accommodating the second saw wheel,
  - a bridge housing located between the first housing and the second housing and accommodating the motor, and
  - an opening below the bridge housing, the band saw blade being at least partly located in the opening; and
- a controller configured to control the motor, the controller being accommodated in the bridge housing with a maximum surface of the controller facing upward.

The portable band saw according to the above aspect of the present disclosure reduces the overall size increase when a larger controller is included.

DETAILED DESCRIPTION

Although one or more embodiments of the present disclosure will now be described with reference to the drawings, the present disclosure is not limited to the embodiments. The components in the embodiments described below may be combined as appropriate. One or more components may be eliminated.

In one or more embodiments, a local coordinate system is defined for a band saw 1. The positional relationship of the components will be described based on the local coordinate system. An XYZ orthogonal coordinate system is used as the local coordinate system. The direction parallel to the X-axis in a predetermined plane is the X-direction. The direction parallel to the Y-axis orthogonal to the X-axis in a predetermined plane is the Y-direction. The direction parallel to the Z-axis orthogonal to each of the X- and Y-axes is the Z-direction. The predetermined plane is the XY plane. The Z-axis is orthogonal to the predetermined plane. In one or more embodiments, the predetermined plane is parallel to the horizontal plane.

The X-direction is the front-rear direction. The positive X-direction is frontward. The negative X-direction is rearward. The Y-direction is the lateral direction. The positive Y-direction is leftward. The negative Y-direction is rightward. The Z-direction is the vertical direction. The positive Z-direction is upward. The negative Z-direction is downward. The direction parallel to each of a first rotation axis CX1 of a rear saw wheel 27 and a second rotation axis CX2 of a front saw wheel 28 (described later) is an MS-direction. The direction orthogonal to each of the MS-direction and the front-rear direction is a KL-direction. The vertical direction is inclined with respect to each of the MS- and KL-directions. An M-direction is one side in the MS-direction. An S-direction is the other side in the MS-direction. A K-direction is one side in the KL-direction. An L-direction is the other side in the KL-direction. The angle between the downward direction and the S-direction is 55 degrees. The angle between the rightward direction and the S-direction is 35 degrees.

Band Saw

Figure 1:
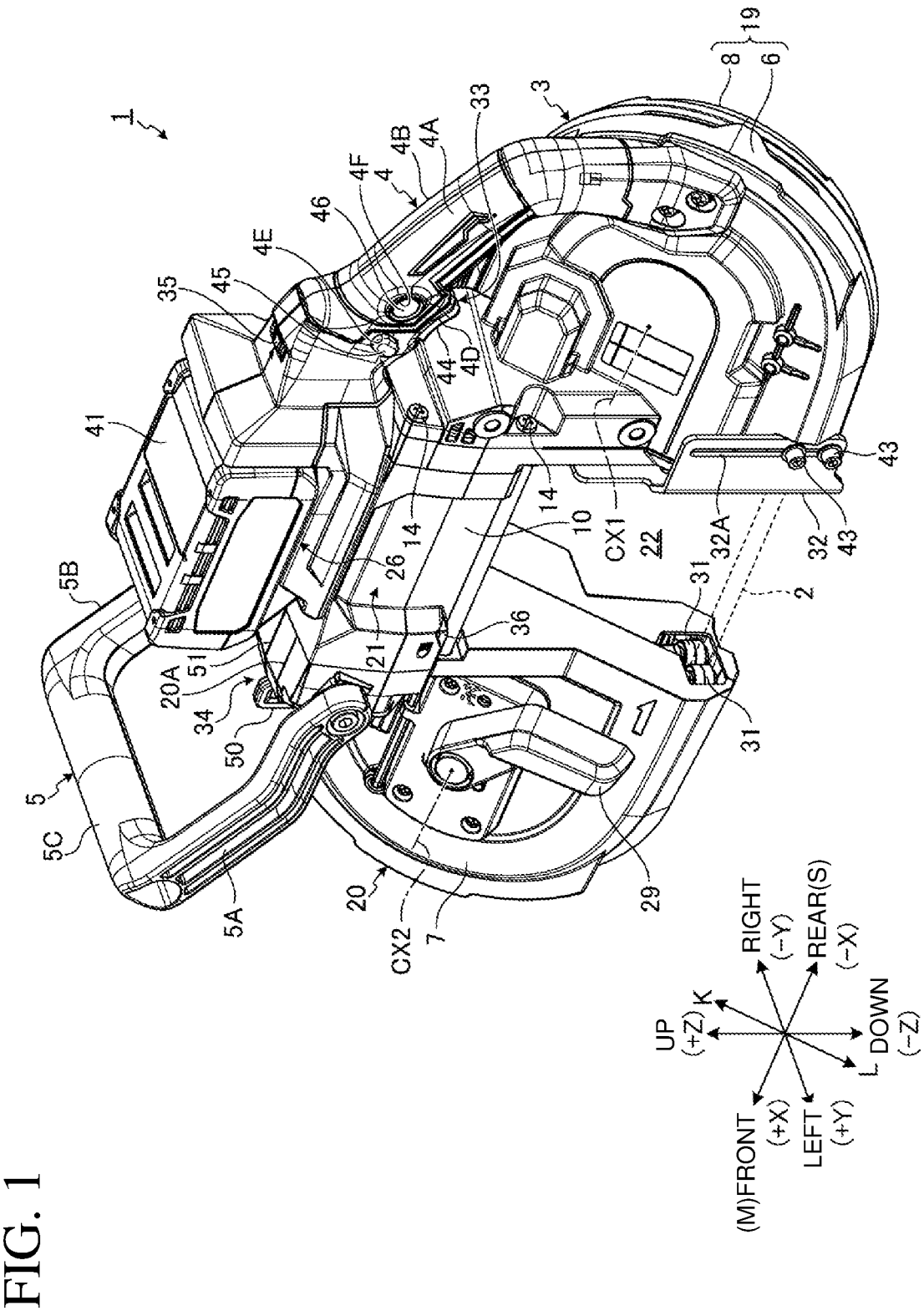
FIG. 1 is a rear perspective view of a band saw according to an embodiment.
Figure 2:
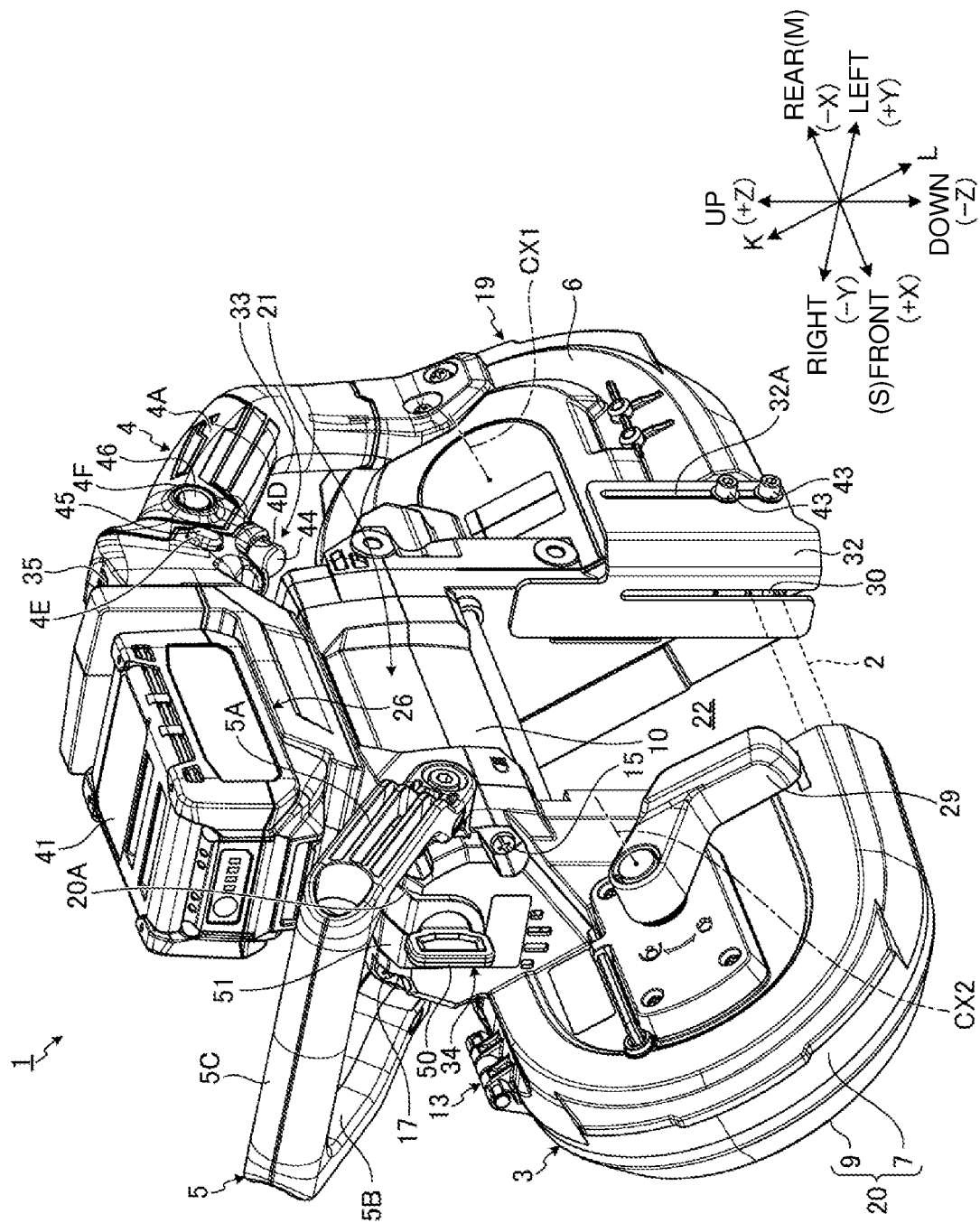
FIG. 2 is a front perspective view of the band saw according to the embodiment.
Figure 3:
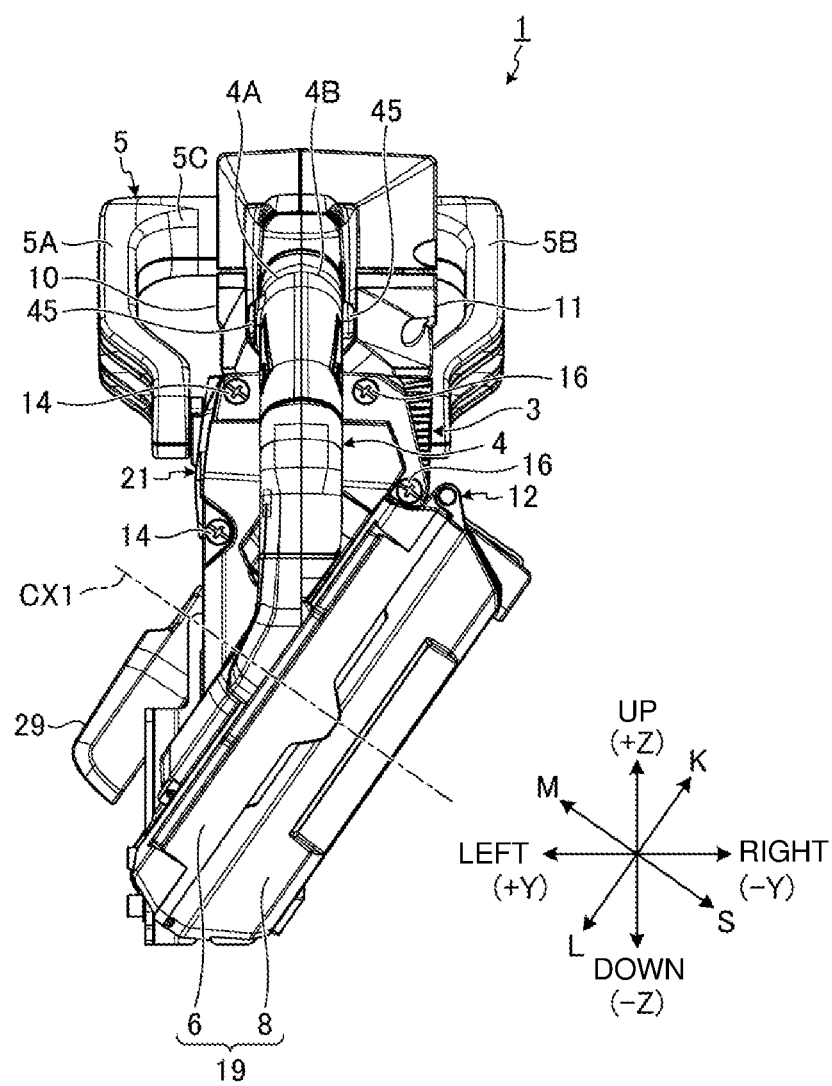
FIG. 3 is a rear view of the band saw according to the embodiment.
Figure 4:
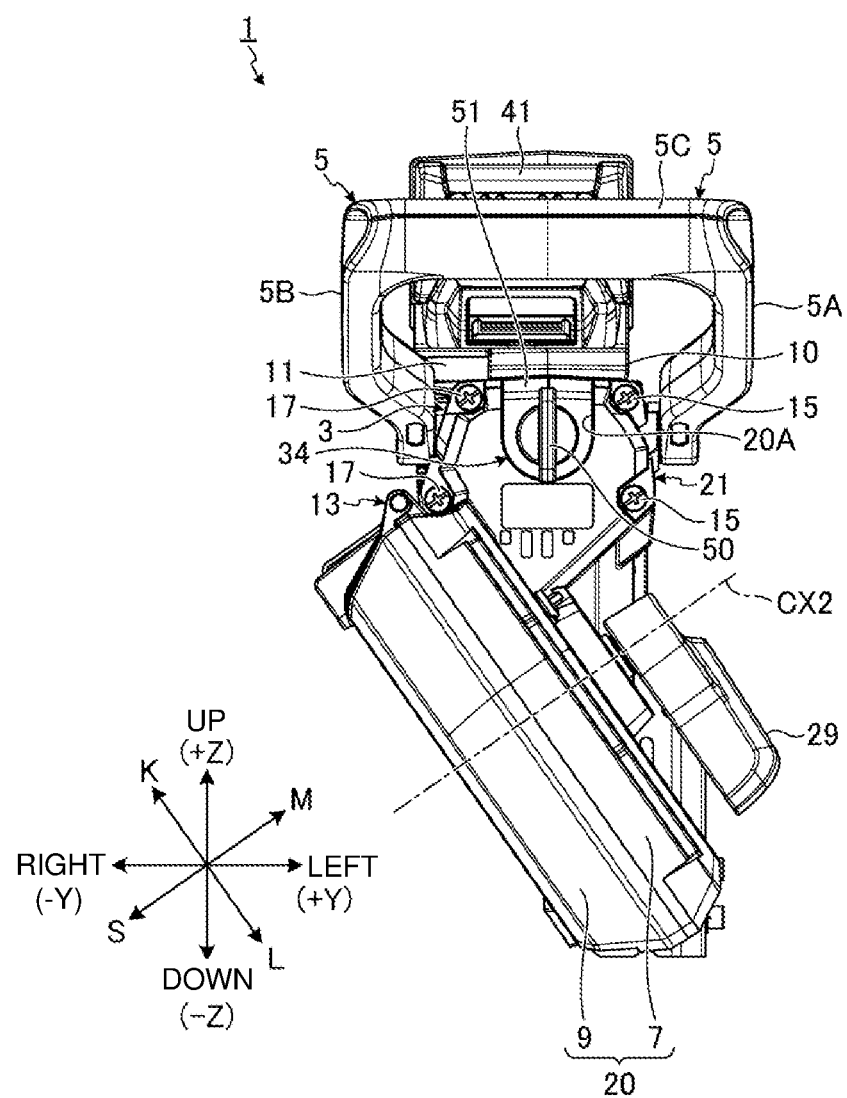
FIG. 4 is a front view of the band saw according to the embodiment.
Figure 5:
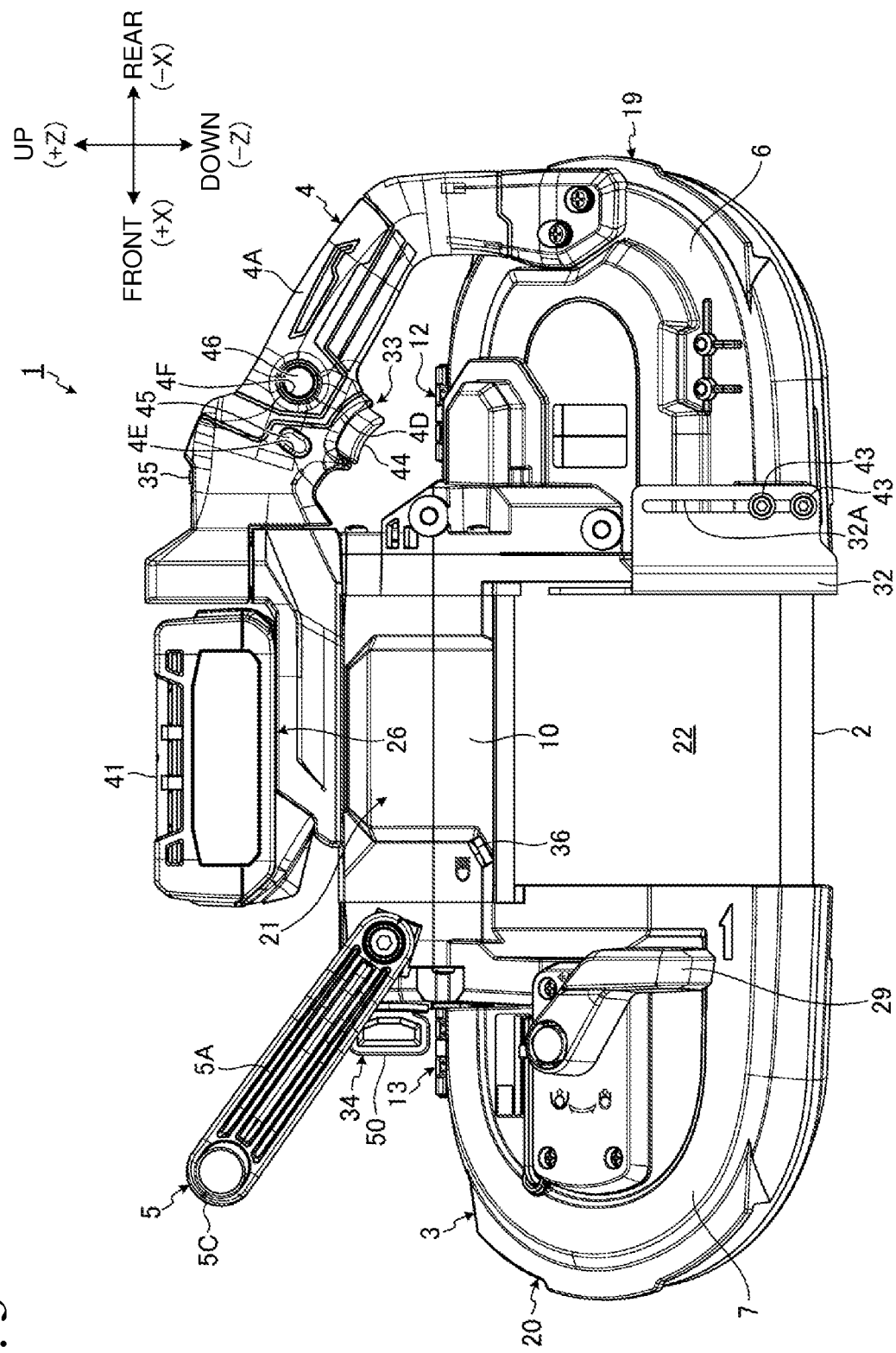
FIG. 5 is a left side view of the band saw according to the embodiment.
Figure 6:
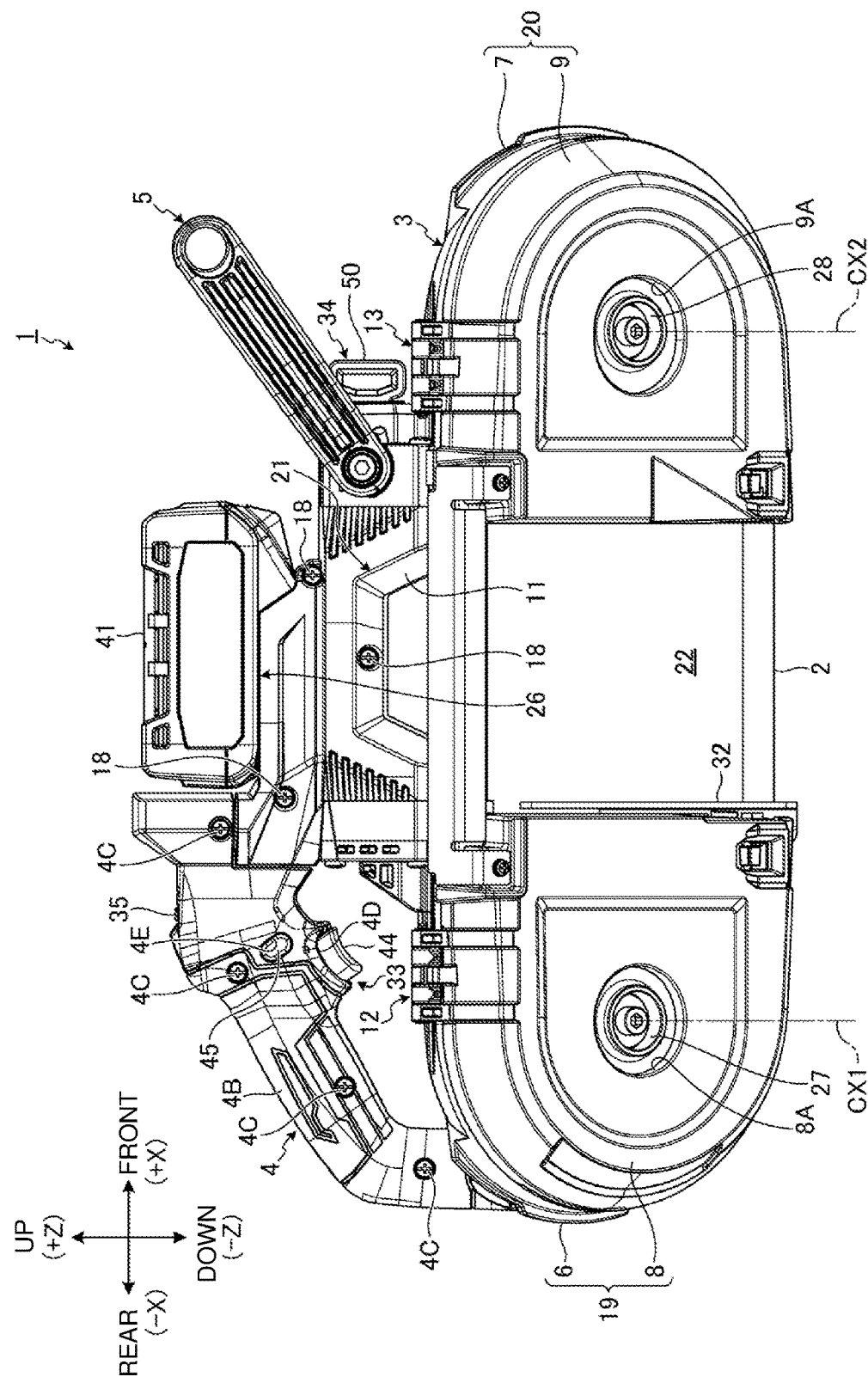
FIG. 6 is a right side view of the band saw according to the embodiment.

FIG. 1 is a rear perspective view of the band saw 1 according to an embodiment. FIG. 2 is a front perspective view of the band saw 1 according to the embodiment. FIG. 3 is a rear view of the band saw 1 according to the embodiment. FIG. 4 is a front view of the band saw 1 according to the embodiment. FIG. 5 is a left side view of the band saw 1 according to the embodiment. FIG. 6 is a right side view of the band saw 1 according to the embodiment.

The band saw 1 is a power tool to cut a workpiece with a rotating band saw blade 2. The band saw 1 according to the embodiment is a portable band saw. A user of the band saw 1 carries the band saw 1. The user of the band saw 1 cuts a workpiece while holding the band saw 1 with a hand.

The band saw 1 includes a housing 3, a main handle 4, and a subhandle 5.

The housing 3 is elongated in the front-rear direction. The housing 3 includes a rear base 6, a front base 7, a rear cover 8, a front cover 9, a left middle cover 10, and a right middle cover 11.

The rear base 6 is rearward from the front base 7. The rear base 6 is a plate. The rear base 6 extends in the KL-direction from the rear to the front. The rear cover 8 is located on the lower right (S-direction) of the rear base 6. The rear cover 8 is a plate. The rear cover 8 extends in the KL-direction from the rear to the front.

The rear base 6 and the rear cover 8 are parallel to each other and overlap. An upper right portion of the rear base 6 and an upper right portion of the rear cover 8 are connected with a hinge 12. The rotation axis of the hinge 12 is parallel to the X-axis. The rear base 6 and the rear cover 8 define a rear space between them.

The front base 7 is frontward from the rear base 6. The front base 7 is a plate. The front base 7 extends in the KL-direction from the rear to the front. The front cover 9 is located on the lower right (S-direction) of the front base 7. The front cover 9 is a plate. The front cover 9 extends in the KL-direction from the rear to the front.

The front base 7 and the front cover 9 are parallel to each other and overlap. An upper right portion of the front base 7 and an upper right portion of the front cover 9 are connected with a hinge 13. The rotation axis of the hinge 13 is parallel to the X-axis. The front base 7 and the front cover 9 define a front space between them. The hinge 12 and the hinge 13 are coaxial.

The left middle cover 10 is between an upper (upper left) portion of the rear base 6 and an upper (upper left) portion of the front base 7. A rear portion of the left middle cover 10 and the upper (upper left) portion of the rear base 6 are fastened with screws 14. A front portion of the left middle cover 10 and the upper (upper left) portion of the front base 7 are fastened with screws 15.

The right middle cover 11 is between the upper portion of the rear base 6 and the upper portion of the front base 7. A rear portion of the right middle cover 11 and the upper portion of the rear base 6 are fastened with screws 16. A front portion of the right middle cover 11 and the upper portion of the front base 7 are fastened with screws 17.

The right middle cover 11 is on the right of the left middle cover 10. The left middle cover 10 and the right middle cover 11 are fastened with screws 18. The left middle cover 10 and the right middle cover 11 define a middle space between them.

Each of the rear base 6 and the front base 7 is formed from a metal such as aluminum or magnesium.

Each of the rear cover 8 and the front cover 9 is formed from a synthetic resin such as a polycarbonate resin or a polyamide resin.

Each of the left middle cover 10 and the right middle cover 11 is formed from a synthetic resin such as a polycarbonate resin or a polyamide resin.

In the example described below, the rear base 6 and the rear cover 8 are referred to as a rear housing 19 for convenience. The front base 7 and the front cover 9 are referred to as a front housing 20 for convenience. The left middle cover 10 and the right middle cover 11 are referred to as a bridge housing 21 for convenience.

In the front-rear direction, the bridge housing 21 is between the rear housing 19 and the front housing 20. The rear housing 19 is behind the bridge housing 21. The front housing 20 is in front of the bridge housing 21. The bridge housing 21 connects an upper portion of rear housing 19 and an upper portion of the front housing 20. A lower portion of the bridge housing 21, a front portion of the rear housing 19, and a rear portion of the front housing 20 define an opening 22 between them. The opening 22 is defined below the bridge housing 21.

The main handle 4 is held by the user of the band saw 1. The main handle 4 connects a rear portion of the bridge housing 21 and a rear portion of the rear base 6. The main handle 4 is behind the bridge housing 21. The main handle 4 is half-split. The main handle 4 includes a left handle 4A and a right handle 4B. The left handle 4A and the right handle 4B are fastened with multiple screws 4C. The left handle 4A and the right handle 4B define a handle space between them.

The subhandle 5 is held by the user of the band saw 1. The subhandle 5 includes a left arm 5A, a right arm 5B, and a grip 5C. The left arm 5A is connected to the upper left portion of the front base 7. The right arm 5B is connected to the upper right portion of the front base 7. The grip 5C connects the left arm 5A and the right arm 5B.

The left arm 5A extends from the upper left portion of the front base 7 upward toward the front. The right arm 5B extends from the upper right portion of the front base 7 upward toward the front. The grip 5C connects the upper end of the left arm 5A and the upper end of the right arm 5B.

Figure 7:
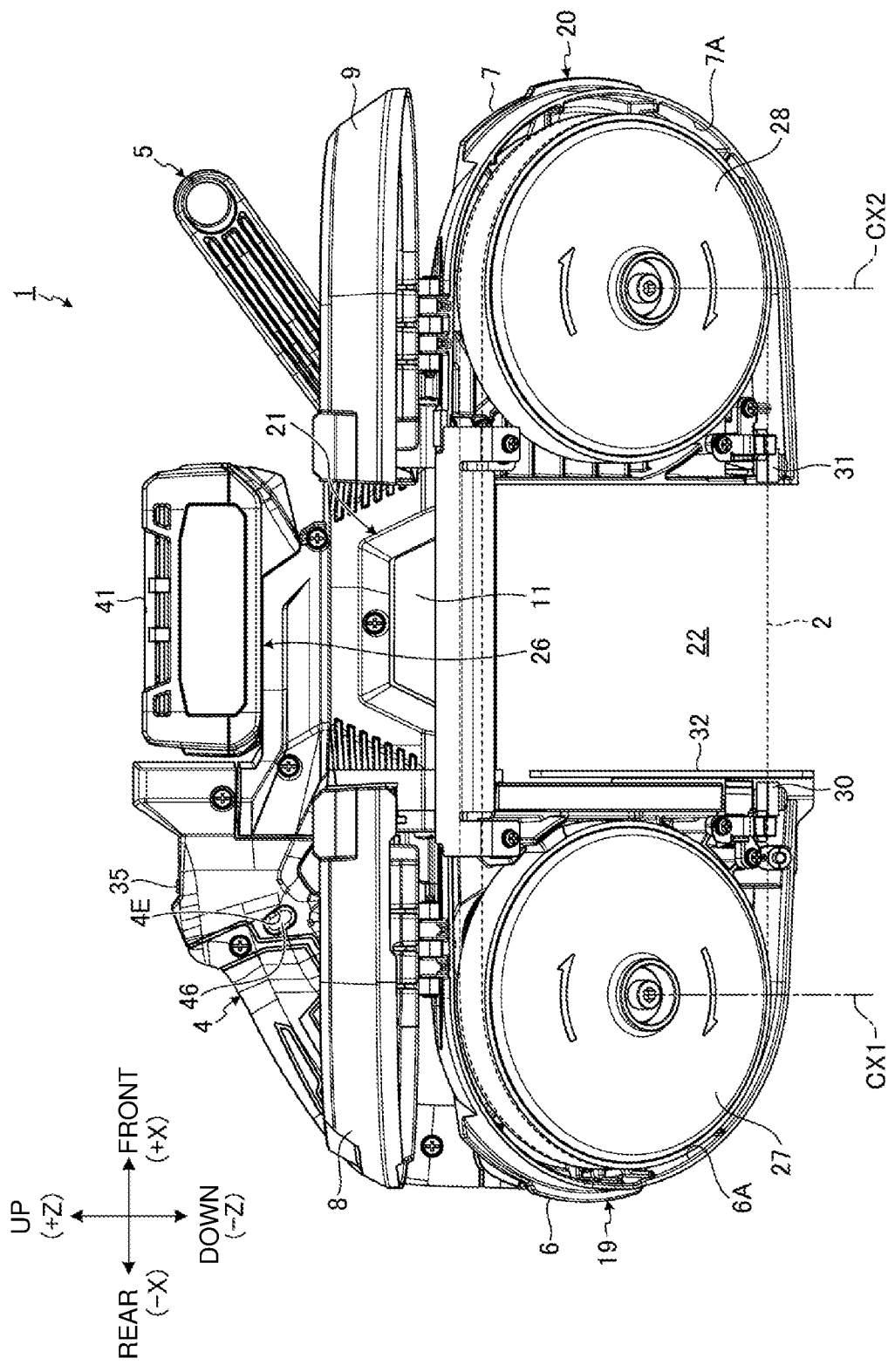
FIG. 7 is a right side view of the band saw according to the embodiment with its rear cover and front cover open.
Figure 8:
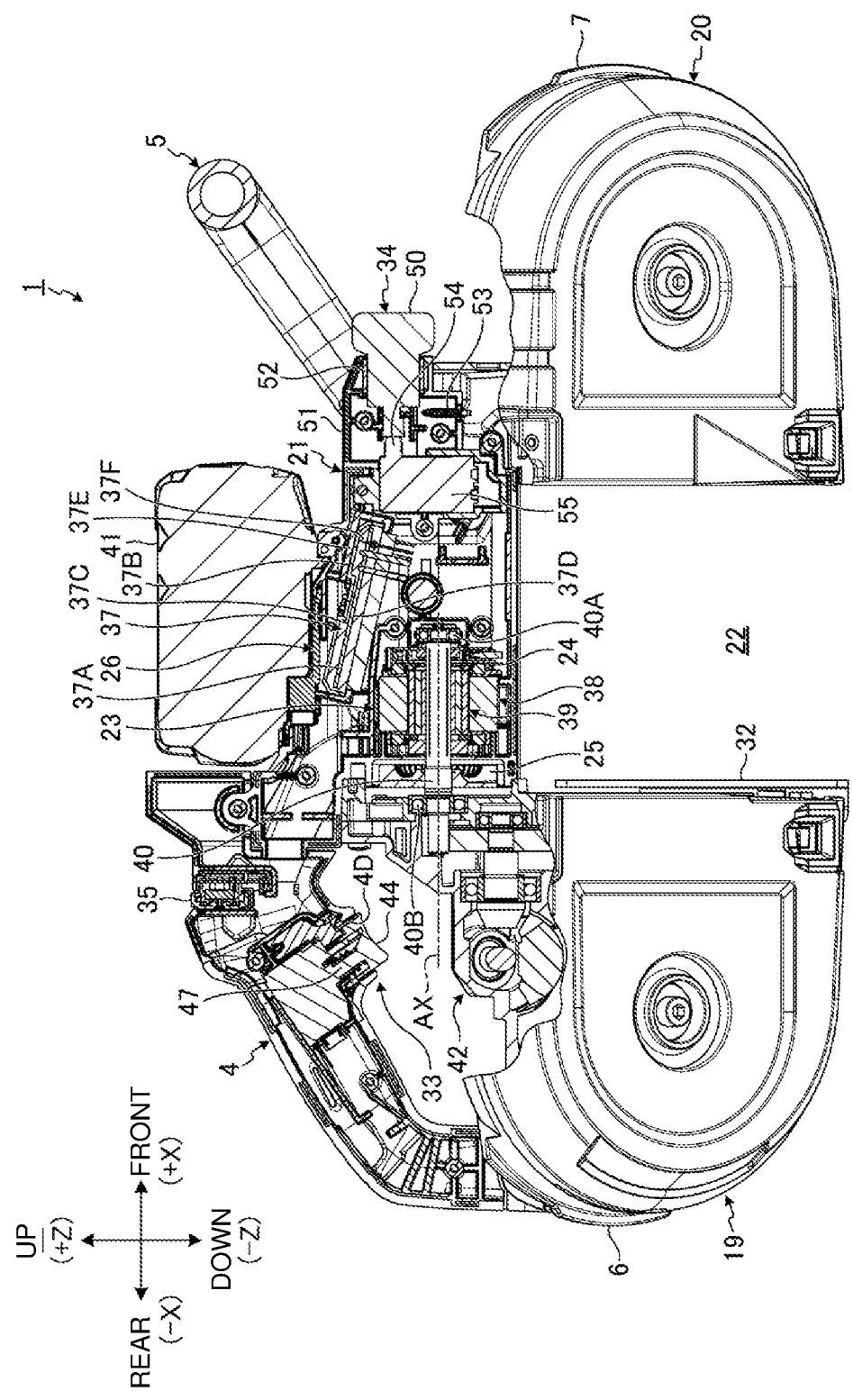
FIG. 8 is a cross-sectional view of the band saw according to the embodiment.
Figure 9:
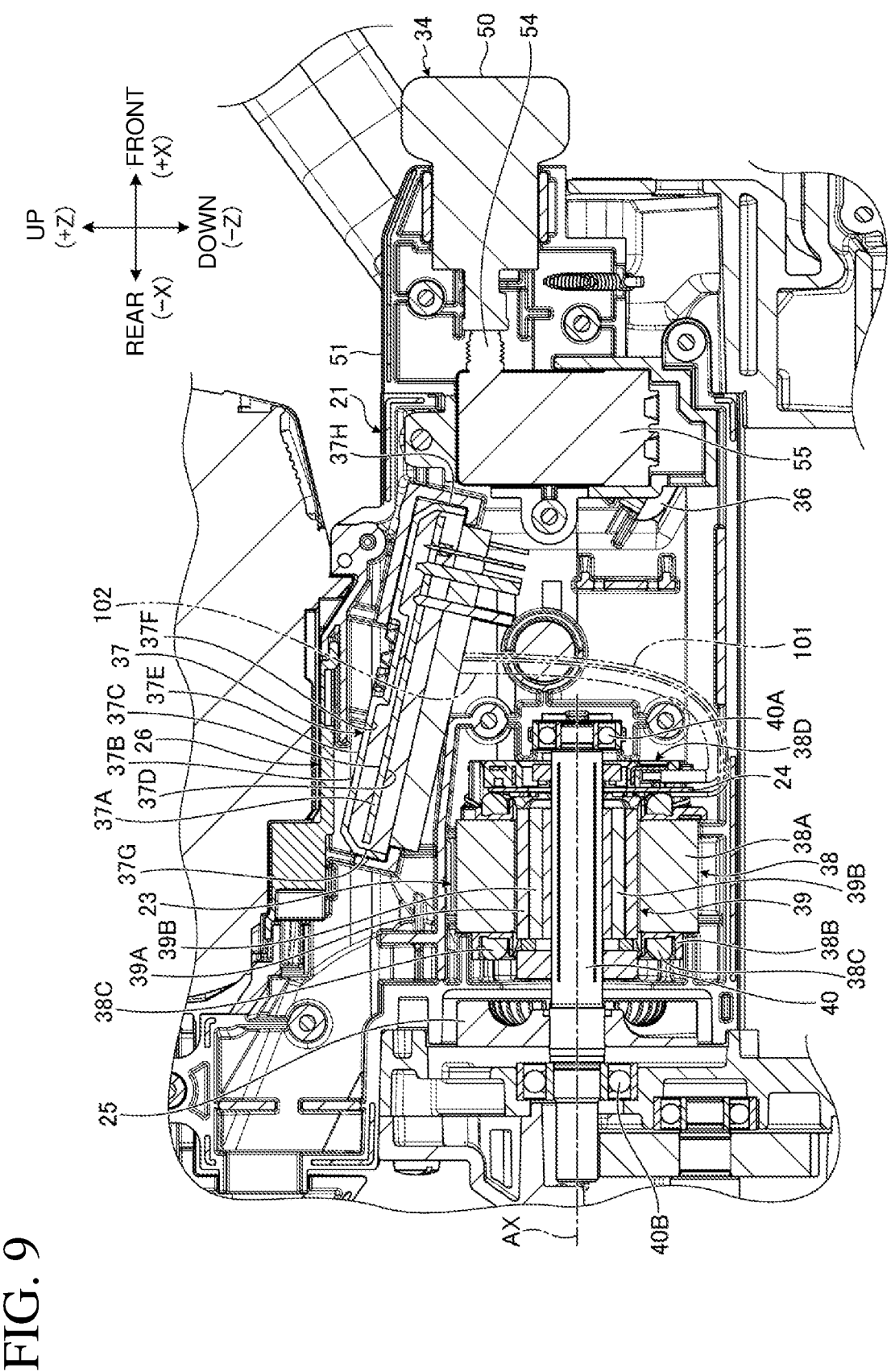
FIG. 9 is a partially enlarged cross-sectional view of the band saw according to the embodiment.

FIG. 7 is a right side view of the band saw 1 according to the embodiment with the rear cover 8 and the front cover 9 open. FIG. 8 is a cross-sectional view of the band saw 1 according to the embodiment. FIG. 9 is a partially enlarged cross-sectional view of the band saw 1 according to the embodiment.

As shown in FIGS. 1 to 9, the band saw 1 includes a motor 23, a sensor board 24, a fan 25, a battery mount 26, the rear saw wheel 27, the front saw wheel 28, the band saw blade 2, a tension adjustment lever 29, rear guide rollers 30, front guide rollers 31, a stopper plate 32, a main switch assembly 33, a stand switch assembly 34, a variable speed dial 35, a lamp 36, and a controller 37.

The motor 23 is a power source for the band saw 1. The bridge housing 21 accommodates the motor 23. In other words, the motor 23 is located in the middle space that is an internal space of the bridge housing 21. The motor 23 is at the rear of the middle space. The motor 23 is a brushless inner-rotor motor. The motor 23 includes a stator 38, rotor 39, and a rotor shaft 40.

The stator 38 surrounds the rotor 39. The stator 38 includes a stator core 38A, an insulator 38B, multiple coils 38C, and a busbar unit 38D. The insulator 38B is fixed to the stator core 38A. The multiple coils 38C are attached to the stator core 38A with the insulator 38B between them. The busbar unit 38D connects the multiple coils 38C. The busbar unit 38D is frontward from the stator core 38A.

The rotor 39 includes a rotor core 39A and multiple permanent magnets 39B. The multiple permanent magnets 39B are fixed to the rotor core 39A.

The rotor shaft 40 is located inside the rotor core 39A. The rotor core 39A is substantially cylindrical. The rotor shaft 40 is fixed to the rotor core 39A. A front portion of the rotor shaft 40 is frontward from the stator 38. A rear portion of the rotor shaft 40 is rearward from the stator 38. The rotor shaft 40 is rotatably supported by a bearing 40A. The rear portion of rotor shaft 40 is rotatably supported by a bearing 40B. The bridge housing 21 supports the bearings 40A and 40B.

The rotor 39 and the rotor shaft 40 rotate about a motor rotation axis AX. The motor rotation axis AX is parallel to the X-axis. In other words, the motor rotation axis AX extends in the front-rear direction.

The sensor board 24 detects the position of the rotor 39 in the rotation direction of the rotor 39. The bridge housing 21 accommodates the sensor board 24. The sensor board 24 supports a magnetic sensor. The magnetic sensor detects the permanent magnets 39B in the rotor 39. The magnetic sensor detects the position of the rotor 39 in the rotation direction of the rotor 39 by detecting the magnetic field of the permanent magnets 39B. The sensor board 24 is frontward from the stator core 38A. The sensor board 24 is fixed to the insulator 38B on the stator 38.

The fan 25 is fixed to the rear portion of the rotor shaft 40. The fan 25 is between the bearing 40B and the stator core 38A. The fan 25 and the rotor shaft 40 rotate together. This structure generates an airflow to cool the motor 23 and the controller 37.

The battery mount 26 is connected to a battery pack 41. The battery pack 41 is attached to the battery mount 26. The battery mount 26 is above the bridge housing 21. The battery pack 41 is a power supply for the band saw 1. The battery pack 41 includes a rechargeable battery. The battery pack 41 supplies direct current (DC) to the band saw 1.

The power output from the battery pack 41 is supplied to the busbar unit 38D in the stator 38 through the controller 37.

The rear housing 19 accommodates the rear saw wheel 27. In other words, the rear saw wheel 27 is located in the rear space that is an internal space of the rear housing 19. The rear saw wheel 27 is partly exposed through an opening 8A in the rear cover 8. The rear saw wheel 27 is rotatably supported by the rear base 6. The rear saw wheel 27 rotates about the first rotation axis CX1. The first rotation axis CX1 is parallel to the YZ plane. The first rotation axis CX1 is oblique upward toward the left. The first rotation axis CX1 is inclined at an angle of 55 degrees with respect to the downward direction.

The front housing 20 accommodates the front saw wheel 28. In other words, the front saw wheel 28 is located in the front space that is an internal space of the front housing 20. The front saw wheel 28 is partly exposed through an opening 9A in the front cover 9. The front saw wheel 28 is rotatably supported by the front base 7. The front saw wheel 28 rotates about the second rotation axis CX2. The first rotation axis CX1 and the second rotation axis CX2 are parallel to each other. The second rotation axis CX2 is inclined at an angle of 55 degrees with respect to the downward direction.

The band saw blade 2 is placed on the rear saw wheel 27 and the front saw wheel 28. The band saw blade 2 is annular. The band saw blade 2 is pulled forward and backward with the rear saw wheel 27 and the front saw wheel 28. The band saw blade 2 is at least partly located in the opening 22. The left surface and the right surface of the band saw blade 2 are parallel to each other in the region except the opening 22. The left surface of the band saw blade 2 is parallel to the XZ plane in the region of the opening 22. In other words, the band saw blade 2 is twisted to change from an orientation parallel to the right surface of the band saw blade 2 to an orientation parallel to the XZ plane near the boundary of the opening 22. The twist angle of the band saw blade 2 is 55 degrees.

As shown in FIG. 7, the rear base 6 has an opening 6A in its right portion. The rear cover 8 covers the opening 6A. The rear cover 8 is operable to open and close the opening 6A. The front base 7 has an opening 7A in its right portion. The front cover 9 covers the opening 7A. The front cover 9 is operable to open and close the opening 7A. In replacing the band saw blade 2, the openings 6A and 7A are open.

The rotor shaft 40 is connected to the rear saw wheel 27 with a power transmission 42. The power transmission 42 includes a bevel gear. The rotational force of the rotor shaft 40 is transmitted to the rear saw wheel 27 through the power transmission 42. This structure rotates the rear saw wheel 27.

The motor 23 drives the rear saw wheel 27. The rear saw wheel 27 serves as a driving wheel. The front saw wheel 28 serves as a follower wheel. Once the motor 23 rotates the rear saw wheel 27 about the first rotation axis CX1, the band saw blade 2 rotates while being supported by the rear saw wheel 27 and front saw wheel 28. The front saw wheel 28 rotates about the second rotation axis CX2 following the rotation of the rear saw wheel 27 with the band saw blade 2 placed on the wheels.

The tension adjustment lever 29 is operable to adjust the tension of the band saw blade 2. The tension adjustment lever 29 is connected to the front saw wheel 28. The tension adjustment lever 29 is operable to move the front saw wheel 28 forward and backward. This structure adjusts the tension of the band saw blade 2.

The rear guide rollers 30 guide the band saw blade 2. The rear guide rollers 30 are located in a front portion of the rear base 6 facing the opening 22. A pair of the rear guide rollers 30 sandwich the band saw blade 2 in the lateral direction. The rotation axes of the rear guide rollers 30 are parallel to the Z-axis.

The front guide rollers 31 guide the band saw blade 2. The front guide rollers 31 are located in a rear portion of the front base 7 facing the opening 22. A pair of the front guide rollers 31 sandwich the band saw blade 2 in the lateral direction. The rotation axes of the front guide rollers 31 are parallel to the Z-axis.

The stopper plate 32 supports a workpiece. The rear base 6 supports the stopper plate 32 in its front portion. The band saw blade 2 rotates to move from the front base 7 to the rear base 6 in the opening 22. The stopper plate 32 reduces the likelihood that the workpiece moves with the rotation of the band saw blade 2. The stopper plate 32 has a vertically elongated through-hole 32A. The stopper plate 32 is fastened to the rear base 6 with screws 43 placed through the through-hole 32A.

The main switch assembly 33 is operable to drive or stop the motor 23. The main switch assembly 33 is located in the main handle 4. The main switch assembly 33 is at least partly located in the handle space that is an internal space of the main handle 4.

The main switch assembly 33 includes a trigger 44, lock-off actuators 45, a lock-on actuator 46, and a switch 47.

The trigger 44 is operable to drive the motor 23. The trigger 44 is located in an upper portion of the main handle 4. The main handle 4 has an opening 4D to receive the trigger 44. The opening 4D is in the lower surface of the upper portion of the main handle 4. The switch 47 is located in the handle space. The trigger 44 is pulled into the handle space to operate the switch 47. This operation drives the motor 23.

The lock-off actuators 45 are operable to place the operation of the trigger 44 from a restricted state to a permitted state. The lock-off actuators 45 are located in the upper portion of the main handle 4. The main handle 4 has openings 4E to receive the lock-off actuators 45. The openings 4E are located in the left and right surfaces of the upper portion of the main handle 4. Once the lock-off actuators 45 are pushed into the handle space, the operation of the trigger 44 is changed from the restricted state to the permitted state.

When the lock-off actuator 45 are not operated, the trigger 44 is inoperable. The user of the band saw 1 then cannot operate the trigger 44. Once the lock-off actuators 45 are pushed into the handle space, the restricted state is released, and the operation of the trigger 44 is permitted. This operation allows the user of the band saw 1 to operably pull the trigger 44.

The lock-on actuator 46 is operable to maintain the pull operation of the trigger 44. The lock-on actuator 46 is located in the upper portion of the main handle 4. The main handle 4 has an opening 4F to receive the lock-on actuator 46. The opening 4F is located in the left surface of the upper portion of the main handle 4. After the trigger 44 is pulled, the lock-on actuator 46 is pushed into the handle space to maintain the pull operation of the trigger 44. Despite the pull operation of the trigger 44 then being released, the motor 23 remains in a lock-on state for continued driving. After pulling the trigger 44 with a finger and pushing the lock-on actuator 46, the user of the band saw 1 removing the finger from the trigger 44 can continue to drive the motor 23.

In other words, the motor 23 stops in an off-state before the trigger 44 is pulled. In the restricted state before the lock-off actuators 45 are pushed, the pull operation of the trigger 44 is restricted. This is a lock-off state in which the motor 23 remains off.

In the permitted state after the lock-off actuators 45 are pushed, the pull operation of the trigger 44 is permitted. In the on-state after the lock-off actuators 45 are pushed and the trigger 44 is pulled, the motor 23 drives. In a maintained state after the trigger 44 is pulled and the lock-on actuator 46 is pushed, the pull operation of the trigger 44 is maintained. This is a lock-on state in which the motor 23 remains on. After the user releases the finger from the trigger 44 and the lock-on actuator 46 in the lock-on state, the trigger 44 is pulled again to release the lock-on state.

The stand switch assembly 34 is operable to drive or stop the motor 23. The front housing 20 supports the stand switch assembly 34 in its upper portion. The stand switch assembly 34 includes a trigger 50, a switch case 51, a momentary switch 54, and a switch circuit 55. The trigger 50 is movably supported by the switch case 51. The momentary switch 54 is operated with the trigger 50. The switch circuit 55 is connected to the momentary switch 54. The switch case 51 accommodates the momentary switch 54 and the switch circuit 55.

The stand switch assembly 34 is at the front of the bridge housing 21. The stand switch assembly 34 is at least partly received in a recess 20A in the upper portion of the front housing 20. The stand switch assembly 34 is at least partly between the left arm 5A and the right arm 5B of the subhandle 5.

The variable speed dial 35 is operable to adjust the rotational speed of the motor 23. The variable speed dial 35 is located in the upper portion of the main handle 4.

The lamp 36 illuminates a workpiece. The lamp 36 also illuminates the band saw blade 2 located in the opening 22. The bridge housing 21 supports the lamp 36. The lamp 36 is located in a lower front portion of the bridge housing 21.

The controller 37 controls at least the motor 23. The controller 37 controls a drive current supplied to the motor 23 based on detection signals from the magnetic sensor mounted on the sensor board 24. The controller 37 includes a single printed circuit board 37A on which multiple electronic components are mounted. The controller case 37B supports the printed circuit board 37A. The controller case 37B is a vessel with a shallow recess. The recess of the controller case 37B and its outline are rectangular as viewed in the direction of the recess. The recess receives the printed circuit board 37A that is also rectangular and has substantially the same shape as the controller case 37B. The bottom of the controller case 37B is referred to as a controller case front surface 37E. A surface of the controller case 37B opposite to the controller case front surface 37E is referred to as a controller case rear surface 37F. A surface of the printed circuit board 37A from which a lead wire 101 extends is referred to as a board rear surface 37D. A surface of the printed circuit board 37A opposite to the board rear surface 37D is referred to as a printed surface 37C.

The bridge housing 21 accommodates the controller 37. In other words, the controller 37 is located in the middle space that is the internal space of the bridge housing 21. The controller 37 is located in an upper portion of the middle space. The controller 37 is at least partly above the motor 23. In the XY plane, the motor 23 and the controller 37 at least partly overlap. The controller 37 is rearward from the stand switch assembly 34.

The controller 37 controls the motor 23 based on operational signals from at least one of the main switch assembly 33 and the stand switch assembly 34. Electronic components included in the main switch assembly 33 and electronic components included in the stand switch assembly 34 are connected in series.

Once the main switch assembly 33 is operated to drive or stop the motor 23, the stand switch assembly 34 is set to the lock-on state. In this state, the user of the band saw 1 can drive or stop the motor 23 by operating the main switch assembly 33.

Once the stand switch assembly 34 is operated to drive or stop the motor 23, the main switch assembly 33 is set to the lock-on state. In this state, the user of the band saw 1 can drive or stop the motor 23 by operating the stand switch assembly 34.

In the present embodiment, a maximum surface of the controller 37 having the largest area is the controller case front surface 37E. The surfaces of the controller 37 having the second largest area after the maximum surface are the printed surface 37C, the board rear surface 37D, and the controller case rear surface 37F. The bridge housing 21 accommodates the controller 37 with the printed surface 37C and the controller case front surface 37E facing upward. The battery mount 26 is above the controller 37. The bridge housing 21 accommodates the controller 37 with the printed surface 37C and the controller case front surface 37E facing toward the battery mount 26. The bridge housing 21 supports the controller 37.

In the front-rear direction, the controller 37 at least partly overlaps the battery mount 26. In other words, the controller 37 is at least partly at the same position as the battery mount 26 in the front-rear direction.

The controller case front surface 37E and the printed surface 37C are inclined with respect to the motor rotation axis AX. The bridge housing 21 supports the printed circuit board 37A and the controller case 37B with the controller case front surface 37E and the printed surface 37C sloping downward toward the front.

The inclination angles of the controller case front surface 37E and the printed surface 37C are from 5 to 25 degrees inclusive with respect to the motor rotation axis AX. In the embodiment, the inclination angles of the controller case front surface 37E and the printed surface 37C are 13 degrees with respect to the motor rotation axis AX.

The controller 37 is above the motor rotation axis AX. In the vertical direction, the controller 37 is between the battery mount 26 and the motor rotation axis AX.

In the front-rear direction, the controller 37 at least partly overlaps the motor 23. In other words, the controller 37 is at least partly at the same position as the motor 23 in the front-rear direction.

In the embodiment, the controller 37 at least partly overlaps the stator core 38A in the motor 23 in the front-rear direction. In the front-rear direction, the controller 37 is at least partly at the same position as the stator core 38A.

In the radial direction of the motor rotation axis AX, a rear portion 37G (first portion) of the controller 37 is located outside a largest diameter portion of the motor 23. A front portion 37H (second portion) of the controller 37 is located inside the largest diameter portion of the motor 23. In other words, the front portion 37H overlaps the motor 23 in the radial direction of the motor rotation axis AX. In the embodiment, the largest diameter of the motor 23 includes an outer circumferential surface of the stator core 38A.

The front portion 37H of the controller 37 is frontward from the motor 23. The rear portion 37G of the controller 37 is between the front end and the rear end of the stator core 38A in the front-rear direction.

In the front-rear direction, the controller 37 is at least partly between the motor 23 and the stand switch assembly 34.

The lamp 36 is frontward from the motor 23.

The sensor board 24 and the controller 37 are connected with the lead wire 101. Detection signals from the magnetic sensor mounted on the sensor board 24 are transmitted to the controller 37 through the lead wire 101. The lead wire 101 is connected to a lower portion of the sensor board 24.

The busbar unit 38D and the controller 37 are connected with a lead wire 102. A drive current from the battery pack 41 is supplied to the busbar unit 38D in the stator 38 through the controller 37 and the lead wire 102.

Use of Work Tool

Use of the band saw 1 will now be described. In a normal cutting process, the user holds the main handle 4 of the band saw 1 with a dominant hand and the subhandle 5 with another hand to support the weight of the band saw 1. In this state, the user moves the band saw 1 to cut a workpiece fixed at a predetermined position. A chop saw mode and a contour mode will now be described below.

Figure 10:
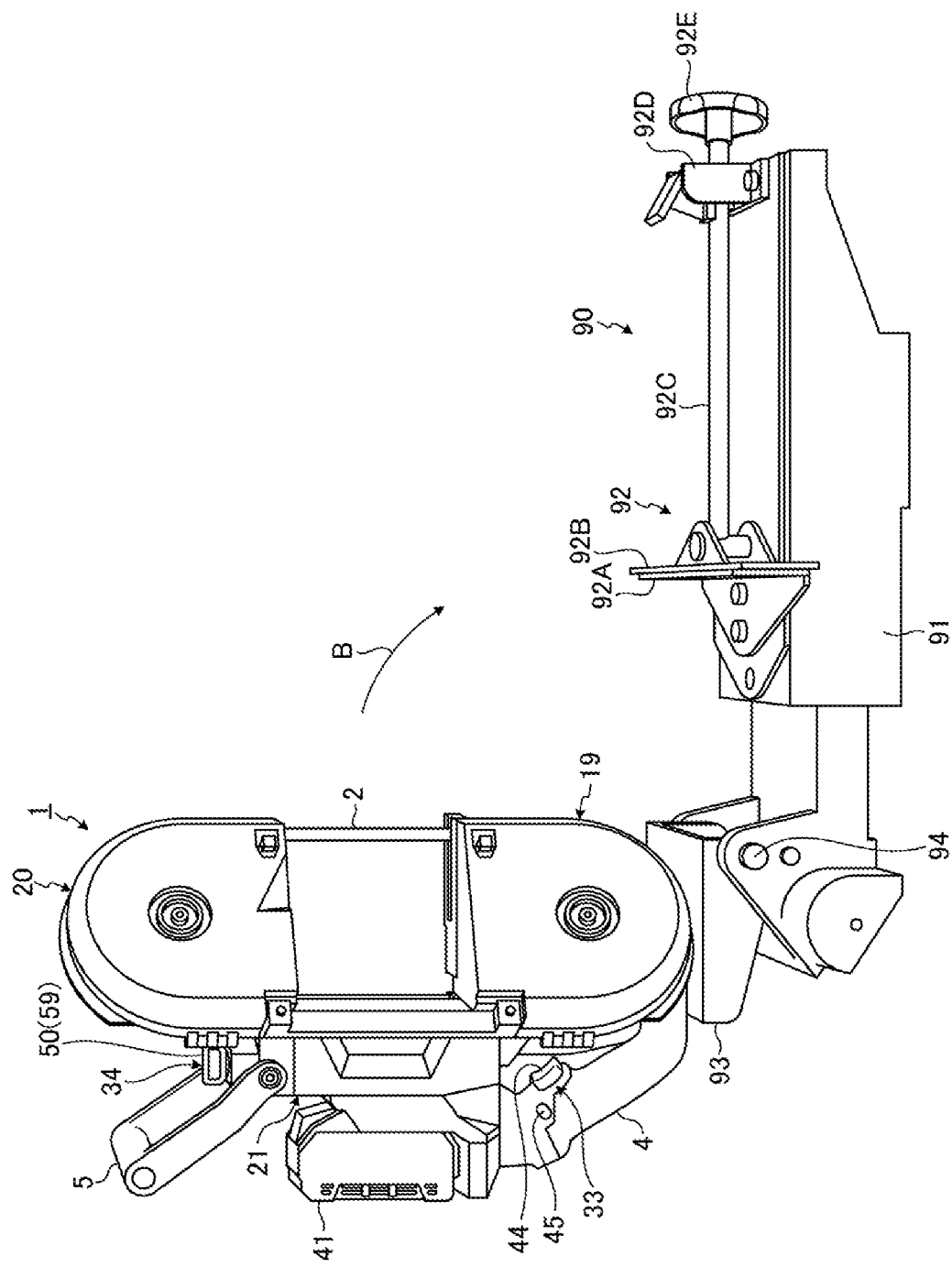
FIG. 10 is a diagram describing use of the band saw according to the embodiment.

FIG. 10 is a diagram describing use of the band saw 1 according to the embodiment. FIG. 10 shows an example use of the band saw 1 in the chop saw mode. In the chop saw mode, the band saw 1 is mounted on a stand 90 for use. The chop saw mode may be referred to as a cutoff mode.

The stand 90 includes a base 91, a vise 92, and a support 93. The base 91 supports the vise 92. The vise 92 fixes a workpiece. The vise 92 includes a stationary vise 92A, a movable vise 92B, a screw 92C, a support 92D, and a knob 92E. The stationary vise 92A is fixed to the base 91. The movable vise 92B faces the stationary vise 92A. The screw 92C moves the movable vise 92B. The screw 92C is rotatably supported by the support 92D. The knob 92E is fixed to an end of the screw 92C. The stationary vise 92A may be referred to as a fence.

The support 93 supports the band saw 1. The support 93 is connected to the base 91 with a hinge 94. The band saw 1 is fastened to the support 93 with screws. The band saw 1 is fastened to the support 93 with the stand switch assembly 34 facing upward. The band saw 1 is connected to the stand 90 to be swingable about the hinge 94 from a substantially vertical state (top dead point) to a substantially horizontal state (bottom dead point).

To cut a workpiece, the user of the band saw 1 places the workpiece between the stationary vise 92A and the movable vise 92B, and then turns the screw 92C to cause the movable vise 92B to approach the stationary vise 92A. The user of the band saw 1 rotates the screw 92C and the knob 92E together while gripping the knob 92E to cause the movable vise 92B to approach the stationary vise 92A. The workpiece is clamped between the stationary vise 92A and the movable vise 92B. This operation fixes the workpiece to the vise 92.

The user of the band saw 1 then operates the stand switch assembly 34 to drive the motor 23. This operation rotates the band saw blade 2. In this state, the user of the band saw 1, for example, gripping the subhandle 5, swings the support 93 from the upper dead point in the direction indicated by the arrow B. In other words, the user of the band saw 1 swings the band saw 1 to cause the band saw blade 2 to approach the workpiece. The workpiece is cut through this operation. The user usually removes the hand from the subhandle 5 upon contact of the rotating band saw blade 2 with the workpiece. The cutting process (lowering of the band saw 1) then continues due to the weight of the band saw 1. After the workpiece is cut (after being swung to the bottom dead point), the user of the band saw 1 operates the stand switch assembly 34 to stop the motor 23.

Figure 11:
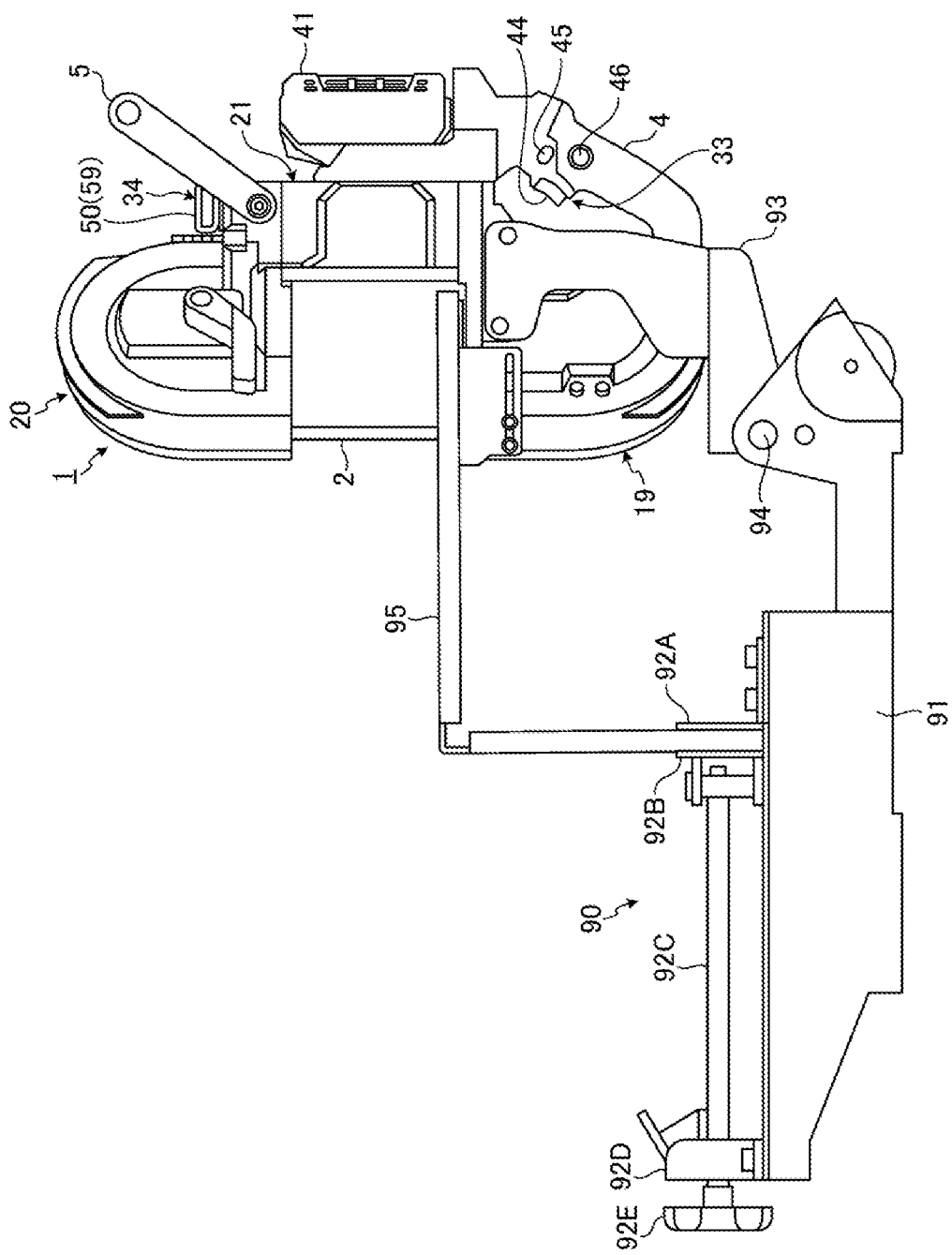
FIG. 11 is a diagram describing use of the band saw according to the embodiment.

FIG. 11 is a diagram describing use of the band saw 1 according to the embodiment. FIG. 11 shows an example use of the band saw 1 in the contour mode. In the contour mode, the band saw 1 is mounted on the stand 90 for use.

The stand 90 includes the base 91, the vise 92, the support 93, and a contour table 95. In the contour mode, the vise 92 fixes at least a part of the contour table 95.

The band saw 1 is fixed to the support 93 substantially vertically with the stand switch assembly 34 facing upward. In the contour mode, the hinge 94 is fixed with a stopper bolt to prevent the support 93 from swinging.

To cut a workpiece, the user of the band saw 1 places a workpiece on the contour table 95 and then operates the stand switch assembly 34 to drive the motor 23. This operation rotates the band saw blade 2. In this state, the user of the band saw 1 causes the workpiece on the contour table 95 to approach the band saw blade 2. The workpiece is cut through this operation. The user of the band saw 1 then operates the stand switch assembly 34 to stop the motor 23.

As described above, the portable band saw 1 according to the embodiment includes the rear saw wheel 27 that is a first saw wheel, the front saw wheel 28 that is a second saw wheel, the band saw blade 2 placed on the rear saw wheel 27 and the front saw wheel 28, the motor 23 that drives the rear saw wheel 27, the controller 37 that controls the motor 23, and the housing 3. The housing 3 includes the rear housing 19 that is a first housing accommodating the rear saw wheel 27, the front housing 20 that is a second housing accommodating the front saw wheel 28, and the bridge housing 21 that is between the rear housing 19 and the front housing 20 and accommodates the motor 23. The motor rotation axis AX extends in the front-rear direction. The band saw blade 2 is at least partly located in the opening 22 of the housing 3 defined below the bridge housing 21. The bridge housing 21 accommodates the controller 37 with the controller case front surface 37E that is the maximum surface of the controller 37 facing upward.

In the above structure, the bridge housing 21 accommodates the controller 37 with the controller case front surface 37E that is the maximum surface of the controller 37 facing upward. This structure reduces the likelihood that the bridge housing 21 have larger dimensions, for example, vertically when the controller 37 is larger. This structure reduces the overall size increase of the band saw 1.

In the embodiment, the controller case front surface 37E that is the maximum surface of the controller 37 is inclined with respect to the motor rotation axis AX.

This structure reduces the likelihood that the bridge housing 21 have larger dimensions, for example, in the front-rear direction.

In the embodiment, the inclination angle of the controller case front surface 37E that is the maximum surface of the controller 37 is from 5 to 25 degrees inclusive with respect to the motor rotation axis AX.

This structure reduces the size increase of the bridge housing 21.

The controller 37 in the embodiment is above the motor rotation axis AX.

This structure reduces the size increase of the bridge housing 21.

In the embodiment, the controller 37 at least partly overlaps the motor 23 in the front-rear direction.

This structure reduces the likelihood that the bridge housing 21 have larger dimensions, for example, in the front-rear direction.

In the embodiment, in the radial direction of the motor rotation axis AX, the rear portion 37G that is the first portion of the controller 37 is located outside the largest diameter portion of the motor 23, and the front portion 37H that is the second portion of the controller 37 is located inside the largest diameter portion of the motor 23.

This structure reduces the likelihood of interference between the motor 23 and the controller 37 and between the motor 23 and electrical components except the controller 37, thus reducing the overall size increase of the band saw 1.

In the embodiment, the rear housing 19 is behind the bridge housing 21, and the front housing 20 is in front of the bridge housing 21. The front portion 37H is thus frontward from the motor 23.

This structure reduces the likelihood of interference between the controller 37 and the rotor shaft 40, thus reducing the overall size increase of the band saw 1.

The band saw 1 according to the embodiment includes the stand switch assembly 34 that is a subswitch assembly at the front of the bridge housing 21 and is operable to drive or stop the motor 23. In the front-rear direction, the controller 37 is at least partly located between the motor 23 and the stand switch assembly 34.

The controller 37 is thus at least partly located in an unused space between the motor 23 and the stand switch assembly 34. This allows effective use of the unused space. In addition, the lead wire 102 connecting the motor 23 and the controller 37 is located in the unused space. This further allows effective use of the unused space.

The band saw 1 according to the embodiment includes the main handle 4 located behind the bridge housing 21 and connecting the rear portion of the bridge housing 21 and the rear housing 19, and the main switch assembly 33 located in the main handle 4 and operable to drive or stop the motor 23.

The stand switch assembly 34 is thus at the front of the bridge housing 21, and the main handle 4 and main switch assembly 33 are behind the bridge housing 21, thus reducing the overall size increase of the band saw 1.

The band saw 1 according to the embodiment includes the variable speed dial 35 located in the main handle 4 and operable to adjust the rotational speed of the motor 23.

This structure reduces the overall size increase of the band saw 1.

In the embodiment, the motor 23 includes the rotor 39 and the stator 38 surrounding the rotor 39. The band saw 1 includes the sensor board 24 supporting the magnetic sensor that detects the position of the rotor 39 in the rotation direction of the rotor 39 and the lead wire 101 connecting the sensor board 24 and the controller 37. The sensor board 24 is frontward from the stator core 38A in the stator 38. The lead wire 101 is connected to the lower portion of the sensor board 24.

The lead wire 101 is thus appropriately located to improve ease of the assembly and repair of the band saw 1.

The band saw 1 according to the embodiment includes the lamp 36 supported by the bridge housing 21 to illuminate the band saw blade 2 located in the opening 22. The lamp 36 is frontward from the motor 23.

This structure reduces the size increase of the bridge housing 21.

The band saw 1 according to the embodiment includes the battery mount 26 located in the upper portion of the bridge housing 21 to receive the battery pack 41 including a rechargeable battery. In the front-rear direction, the controller 37 at least partly overlaps the battery mount 26.

This structure reduces the overall size increase of the band saw 1 vertically.

Other Embodiments

In the embodiment described above, the controller case front surface 37E that is the maximum surface of the controller 37 may be parallel to the motor rotation axis AX. The controller case front surface 37E that is the maximum surface of controller 37 may be parallel to the XY plane. The controller case front surface 37E that is the maximum surface of controller 37 may be parallel to the ZX plane.

In the embodiment described above, the controller 37 may be on the left or right of the motor rotation axis AX. The controller 37 may be below the motor rotation axis AX.

REFERENCE SIGNS LIST 1 band saw
2 band saw blade
3 housing
4 main handle
4A left handle
4B right handle
4C screw
4D opening
4E opening
4F opening
5 subhandle
5A left arm
5B right arm
5C grip
6 rear base
6A opening
7 front base
7A opening
8 rear cover
8A opening
9 front cover
9A opening
10 left middle cover
11 right middle cover
12 hinge 13 hinge
14 screw
15 screw
16 screw
17 screw
18 screw
19 rear housing
20 front housing
20A recess
21 bridge housing
22 opening
23 motor
24 sensor board
25 fan
26 battery mount
27 rear saw wheel (first saw wheel)
28 front saw wheel (second saw wheel)
29 tension adjustment lever
30 rear guide roller
31 front guide roller
32 stopper plate
32A through-hole
33 main switch assembly
34 stand switch assembly
35 variable speed dial
36 lamp
37 controller
37A printed circuit board
37B controller case
37C printed surface
37D board rear surface
37E controller case front surface (maximum surface)
37F controller case rear surface
37G rear portion (first portion)
37H front portion (second portion)
38 stator
38A stator core
38B insulator
38C coil
38D busbar unit
39 rotor
39A rotor core
39B permanent magnet
40 rotor shaft
40A bearing
40B bearing
41 battery pack
42 power transmission
43 screw
44 trigger
45 lock-off actuator
46 lock-on actuator
47 switch
50 trigger
51 switch case
54 momentary switch
55 switch circuit
90 stand
91 base
92 vise
92A stationary vise
92B movable vise
92C screw
92D support
92E knob
93 support
94 hinge
95 contour table
101 lead wire
102 lead wire
AX motor rotation axis
CX1 first rotation axis
CX2 second rotation axis

What is claimed is:

1. A portable band saw, comprising:
a first saw wheel;
a second saw wheel;
a motor (i) configured to drive the first saw wheel and (ii) having a motor rotation axis defining a front-rear direction of the portable band saw;
a band saw blade that (i) engages the first saw wheel and the second saw wheel and (ii) is configured to be driven by the first saw wheel;
a housing including
a first housing accommodating the first saw wheel,
a second housing (i) accommodating the second saw wheel and (ii) spaced from the first housing in the front-rear direction; and
a bridge housing (i) directly between the first housing and the second housing in the front-rear direction, (ii) connecting the first housing and the second housing and (iii) accommodating the motor in an internal space of the bridge housing; and
a controller (i) configured to control the motor, (ii) in the internal space and (iii) having a maximum surface that is inclined in an up-down direction of the portable band saw relative to the motor rotation axis, the up-down direction being perpendicular to the front-rear direction;
wherein:
the first housing, the second housing and the bridge housing define an opening (i) between the first housing and the second housing in the front-rear direction and (ii) below the bridge housing in the up-down direction;
the maximum surface of the controller is a surface of the controller that has a largest area when viewed perpendicular to the surface;
an entirety of the controller is above the motor rotation axis; and
the controller at least partly overlaps the motor in the front-rear direction,
the controller includes a first portion outside a largest diameter portion of the motor and a second portion inside the largest diameter portion of the motor in a radial direction of the motor rotation axis,
the first housing is behind the bridge housing,
the second housing is in front of the bridge housing, and
the entire second portion is frontward from the motor.

2. The portable band saw according to claim 1, wherein an inclination angle of the maximum surface of the controller is 5 to 25 degrees with respect to the motor rotation axis.

3. The portable band saw according to claim 1, further comprising:
a subswitch assembly in a front of the bridge housing and operable to drive or stop the motor,
wherein the controller is at least partly between the motor and the subswitch assembly in the front-rear direction.

4. The portable band saw according to claim 3, further comprising:
   a main handle behind the bridge housing and connecting a rear portion of the bridge housing and the first housing; and
   a main switch assembly in the main handle and operable to drive or stop the motor.

5. The portable band saw according to claim 4, further comprising:
   a variable speed dial in the main handle and operable to adjust a rotational speed of the motor.

6. The portable band saw according to claim 1, wherein the motor includes
   a rotor, and
   a stator surrounding the rotor and including a stator core, and
   the portable band saw further comprises
   a sensor board supporting a magnetic sensor configured to detect a position of the rotor in a rotation direction of the rotor, the sensor board being frontward from the stator core, and
   a lead wire connecting the sensor board and the controller, the lead wire being connected to a lower portion of the sensor board.

7. The portable band saw according to claim 1, further comprising:
   a lamp (i) frontward from the motor, (ii) supported by the bridge housing and (iii) configured to illuminate the band saw blade in the opening.

8. The portable band saw according to claim 1, further comprising:
   a battery mount in an upper portion of the bridge housing and configured to receive and retain a battery pack including a rechargeable battery,
   wherein the controller at least partly overlaps the battery mount in the front-rear direction.

9. The portable band saw according to claim 1, wherein
   the first portion is located in a front portion of the controller, and
   the second portion is located in a rear portion of the controller.

* * * * *